(12) United States Patent  
Venkatasubbarao et al.

(10) Patent No.: US 10,677,038 B2  
(45) Date of Patent: Jun. 9, 2020

(54) SYSTEM AND METHOD FOR PRODUCTION WELL TEST AUTOMATION

(71) Applicant: Honeywell International Inc., Morris Plains, NJ (US)

(72) Inventors: Girish Venkatasubbarao, Bangalore (IN); Michele Loseto, Aberdeen (GB); Ramanuja Puasapati, Bangalore (IN); Nitin Garg, Bangalore (IN); Nivas Sekar, Puducherry (IN); Deepak Dhanapal, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 315 days.

(21) Appl. No.: 15/379,593

(22) Filed: Dec. 15, 2016

(65) Prior Publication Data

US 2018/0108095 A1 Apr. 19, 2018

Related U.S. Application Data

(60) Provisional application No. 62/407,884, filed on Oct. 13, 2016.

(51) Int. Cl.
| | |
|---|---|
| *E21B 44/00* | (2006.01) |
| *G06Q 10/10* | (2012.01) |
| *E21B 49/00* | (2006.01) |
| *E21B 49/08* | (2006.01) |

(52) U.S. Cl.
CPC ............ *E21B 44/00* (2013.01); *E21B 49/008* (2013.01); *E21B 49/08* (2013.01); *G06Q 10/1097* (2013.01); *Y02P 90/20* (2015.11)

(58) Field of Classification Search
CPC ......... E21B 44/00; E21B 49/008; E21B 49/08
USPC ................. 702/123, 6; 166/250.08; 324/73.1
See application file for complete search history.

(56) References Cited

U.S. PATENT DOCUMENTS

| | | | |
|---|---|---|---|
| 4,616,700 A | 10/1986 | Wood et al. | |
| 5,363,696 A | 11/1994 | Cardellini et al. | |
| 5,654,502 A | 8/1997 | Dutton | |
| 6,021,664 A * | 2/2000 | Granato | E21B 49/084 |
| | | | 166/264 |
| 7,415,357 B1 | 8/2008 | Stluka et al. | |
| 8,330,616 B2 | 12/2012 | Means et al. | |
| 2005/0257618 A1* | 11/2005 | Boken | G01N 29/14 |
| | | | 73/587 |
| 2010/0023269 A1* | 1/2010 | Yusti | E21B 43/00 |
| | | | 702/12 |
| 2011/0060472 A1* | 3/2011 | Ocondi | E21B 43/12 |
| | | | 700/282 |

(Continued)

FOREIGN PATENT DOCUMENTS

| | | |
|---|---|---|
| CA | 2846656 A1 | 5/2014 |
| WO | 1997024615 A1 | 7/1997 |
| WO | 2007116006 A1 | 10/2007 |

*Primary Examiner* — Eman A Alkafawi

(57) ABSTRACT

A method includes automatically creating one or more test schedules for a well test of one or more wells in an oil or gas production environment. The method also includes automatically creating one or more test frames for use in generation of the well test. The method further includes, following execution of the test frame, automatically validating one or more test records generated during the one or more test frames. In addition, the method includes automatically creating the well test for determining one or more well characteristics.

18 Claims, 7 Drawing Sheets

(56) References Cited

U.S. PATENT DOCUMENTS

| | | |
|---|---|---|
| 2014/0114577 A1 | 4/2014 | LopezGarcia et al. |
| 2014/0137642 A1 | 5/2014 | Henry et al. |
| 2015/0184511 A1 | 7/2015 | Gordon et al. |
| 2017/0268327 A1* | 9/2017 | Eiman .................. E21B 43/04 |
| 2018/0106393 A1* | 4/2018 | Laessler ............. F16K 37/0033 |

* cited by examiner

FIG. 6 ized, scheduled well tests are often not feasible or complicated by other operations or by the unavailability of test equipment or operators. These problems only get amplified when the numbers of wells to test are in the hundreds or thousands.

SYSTEM AND METHOD FOR PRODUCTION WELL TEST AUTOMATION

CROSS-REFERENCE TO RELATED APPLICATION AND PRIORITY CLAIM

This application claims priority under 35 U.S.C. § 119(e) to U.S. Provisional Patent Application No. 62/407,884 filed on Oct. 13, 2016, which is hereby incorporated by reference in its entirety.

TECHNICAL FIELD

This disclosure relates generally to oil and gas production systems. More specifically, this disclosure relates to a system and method for automating production well tests.

BACKGROUND

Onshore and offshore oil and gas fields encompass large numbers of producing wells. Testing wells and recording test data are often fundamental to the understanding and effective management of oil and gas wells, and for production allocation and accounting. Moreover, periodic comprehensive collection and dissemination of well test data is, in many cases, a key local regulatory mandate. In addition, flow rates and other well parameters taken during well tests can be utilized for many purposes, such as well classification, reserve determination and regulation, pool mapping, determination of production characteristics, and well modelling.

SUMMARY

This disclosure provides a system and method for automating production well tests.

In a first embodiment, a method includes automatically creating one or more test schedules for a well test of one or more wells in an oil or gas production environment. The method also includes automatically creating one or more test frames for use in generation of the well test. The method further includes, following execution of the test frame, automatically validating one or more test records generated during the one or more test frames. In addition, the method includes automatically creating the well test for determining one or more well characteristics.

In a second embodiment, an apparatus includes at least one memory and at least one processing device. The at least one memory is configured to store data associated with a well test of one or more wells in an oil or gas production environment. The at least one processing device is configured to automatically create one or more test schedules for the well test of the one or more wells in the oil or gas production environment. The at least one processing device is also configured to automatically create one or more test frames for use in generation of the well test. The at least one processing device is further configured, following execution of the one or more test frames, to automatically validate one or more test records generated during the one or more test frames. In addition, the at least one processing device is configured to automatically create the well test for determining one or more well characteristics.

In a third embodiment, a non-transitory computer readable medium contains instructions that, when executed by at least one processing device, cause the at least one processing device to automatically create one or more test schedules for a well test of one or more wells in an oil or gas production environment. The medium also contains instructions that, when executed by the at least one processing device, cause the at least one processing device to automatically create one or more test frames for use in generation of the well test. The medium further contains instructions that, when executed by the at least one processing device, cause the at least one processing device to following execution of the one or more test frames, automatically validate one or more test records generated during the one or more test frames. In addition, the medium further contains instructions that, when executed by the at least one processing device, cause the at least one processing device to automatically create the well test for determining one or more well characteristics.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 6 illustrates an example user interface for configuring, performing, and monitoring automated well testing functions according to this disclosure.

DETAILED DESCRIPTION

Figure 1:
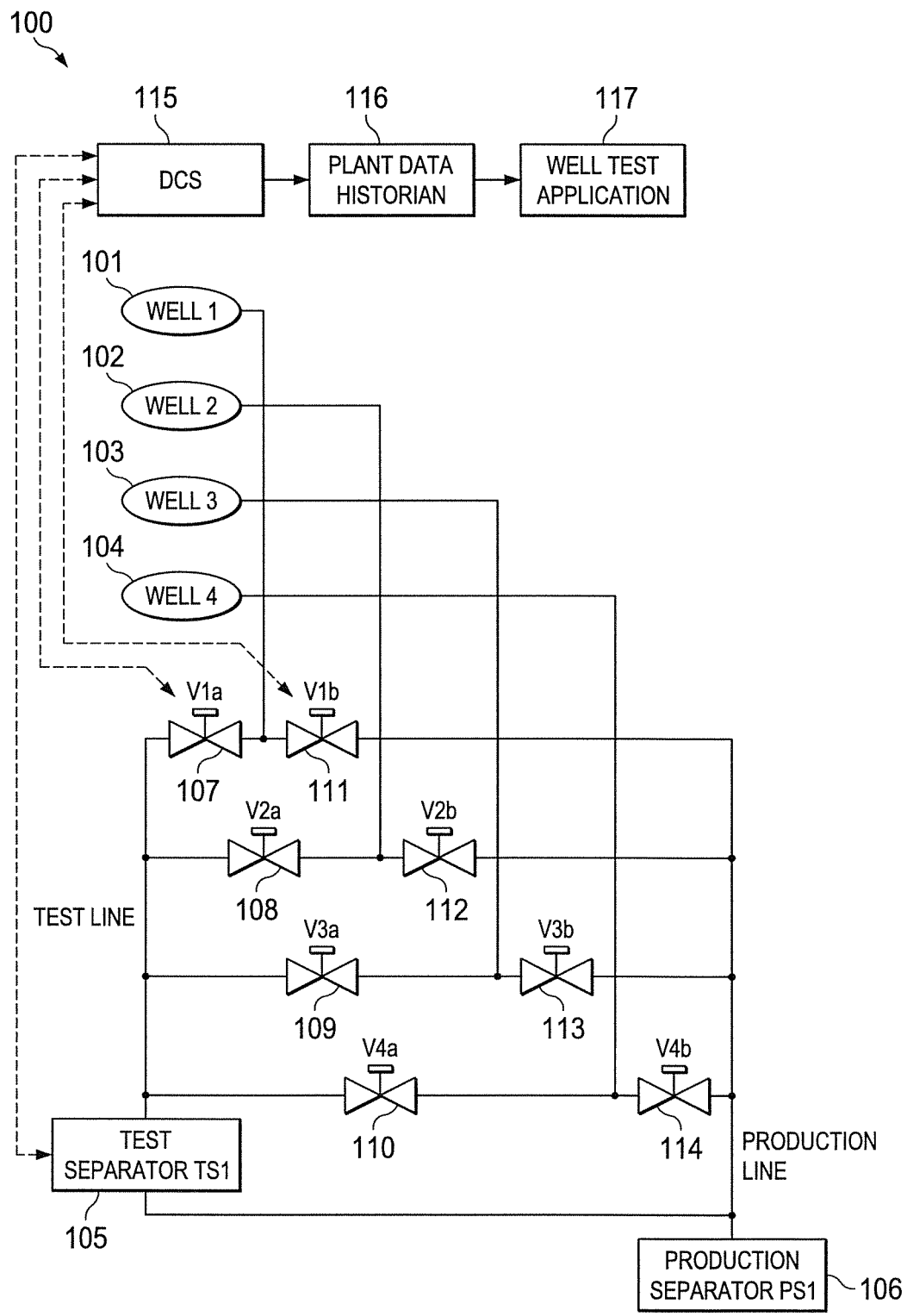
FIG. 1 illustrates an example system used in production testing of oil and gas wells according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described in this patent document. Omission of a feature or component from a particular figure is for purposes of simplicity and clarity and not meant to imply that the feature or component cannot be employed in the embodiment(s) described in connection with that figure.

As noted above, testing oil and gas wells and recording test data are often important or useful operations. Engineering and operational personnel of oil and gas fields often need a reliable application to schedule test for all producing wells on a field, regularly conduct tests, capture measurements, and maintain the measurements as corresponding test records that can be used in deriving characteristics of the wells.

In oil and gas fields, test separators, multi-phase flow meters (MPFM), production separators, or other devices can be used as test devices to record volumetric flow rate of fluid phases (e.g. oil, gas, water), combined with other process variables such as line pressure, line temperature, or other parameters representing the results and conditions during the testing of producing wells. Test devices are often used on a shared basis near well clusters, so producing wells often need to be routed periodically to a test device attached to a test manifold for executing a test. Using historical and real time data associated to wells and test devices in a plant data historian can be very useful or important since they can be used for creating test records. A Distributed Control System (DCS) can coordinate sequential tests of producing wells with the associated test devices for the well testing process, and a plant data historian can periodically scan and store the test related data in one or more databases or other data structures as the tests are executed. During typical field operations, operators and engineers can manually create schedules for production tests, command diverter valves on a test manifold, route producing wells to test devices, and execute tests and create manual test records. These manual operations are tedious since they often require continuous tracking and monitoring. Operators need to know the latest accepted test dates for each producing wells and based on that schedule the next test, and plan the test device slots on a day-to-day basis. Automation of these production well tests is important to improve efficiency.

Most of the above-described manual processes can be automated by executing a well test application. A well test application could be integrated with a DCS and a plant data historian so that the application continuously monitors field operations using the data captured in the plant data historian, interprets actions taken by the DCS on producing wells, uses data from the plant data historian, and creates and monitors test schedules and test records. The disclosed embodiments enable a more automated production testing in oil and gas fields. This results in increased efficiency of the production testing process of an oil and gas field. However, any interruption to the integration or business logic of the well test application can seriously hamper the automated test workflow. As a result, in the event of an outage and recovery, the application may need manual intervention to determine any issues, update the states of existing records, and create new records, which results in a need for manual efforts supported by the application and leveraging on the recovered process data for nor loosing valuable well test footages.

In an oil and gas field with many producing wells, when more downtime occurs, manually interpreting stages of test activities and creating/updating test records can become a burden to users. For example, these activities might take two hours or more per well. Also, this problem becomes more complex when an outage occurs during the middle of an automated workflow since it imposes a challenge to the users on checking the status of all records that were created automatically and interrupted by lost coordination.

To address these and other issues, embodiments of this disclosure quickly determine test issues during downtime and interpret activities along with corresponding required actions, thus enabling users to make decisions for a more smooth recovery. In this disclosure, various embodiments facilitate automatic production testing of oil and gas wells along with a smooth mechanism to automatically recover from test issues that occur during downtime. This enhances the efficiency of users in conducting production tests, as well as provides a quick look at well test processes that may have occurred during integration or software outages.

The disclosed embodiments can be used in production testing of wells in the oil and gas industry. In most of these industries, the production engineers are the primary actors driving the scheduling of well tests, and operators of the DCSs are the primary actors driving the execution of well tests. Not having a shared view of the required test schedule and not following it can result in the skipping of high priority or overdue well tests. Also, any incorrect manual actions during test execution can result in underutilization of a test device in addition to directly affecting productivity by piling up the list of untested wells. The disclosed embodiments considerably reduce the manual efforts in planning and conducting production tests and enable reliability of testing even when a disturbance occurs.

In some embodiments, a well test application is implemented as a web-based application that runs on a separate server or other computing device(s), enabling key workflows of production testing, such as scheduling well tests, creation of test records, validation of test records, and the like from web clients. The well test application can be integrated with an associated DCS or other control system and a plant data historian.

Users can access one or more user interfaces (UIs) of the well test application from web clients and carry out their activities. The well test application can access the status of process variables from a plant data historian for a specified time duration. The well test application can also interpret test events and provide interpretation information to a user, thus enabling the user to take any necessary actions like creating/updating a schedule or test records. The records created by the user can pass through the operation workflow and can be approved or rejected. Approved test records can be published such that next-level users (such as well engineers, production managers, etc.) can access and rely on this data to accomplish their respective activities.

It will be understood that embodiments of this disclosure may include any one, more than one, or all of the features described here. Also, embodiments of this disclosure may additionally or alternatively include other features not listed here. While the disclosed embodiments are described with respect to well testing systems, these embodiments may also be applicable in other suitable systems or applications.

FIG. 1 illustrates an example system 100 used in production testing of a cluster of wells in an oil and gas field according to this disclosure. As shown in FIG. 1, wells 101-104 are producing wells of an oil and gas field. While four wells 101-104 are shown in FIG. 1, it will be understood that systems having more or fewer wells are within the scope of this disclosure. Production output from the wells 101-104 can be routed to a test separator 105 or a production separator 106. The test separator 105 is used as (or represents) a test device to test the wells. As noted above, other types of devices could also be used as the test device, such as a multi-phase flow meter.

Test diverter valves 107-110 enable routing of the production output from a specific well or wells 101-104 to the test separator 105 for production testing purposes. Production diverter valves 111-114 enable routing of the production output from a specific well or wells 101-104 to the production separator 106 for further processing and production output. Each valve 107-114 may be a standard open/close valve, a rotary selector valve (RSV), any other suitable type of valve, or a manifold having a combination of valves, RSVs, or a cascaded connection of RSVs. Each valve 107-114 has an associated status identifier or "tag" that indicates the position status (such as opened, closed, etc.) of the valve. The tag is machine-readable and may be communicated within the system 100 over a wired or wireless communication channel.

A DCS 115 with a suitable input/output (I/O) subsystem can be used to control the diverter valves 107-114 or other control device in the manifold. For example, the DCS 115 can control the diverter valves 107-114 to open or close as needed to couple a specific well or wells 101-104 to the test separator 105. As a specific example, by opening the valve 107 and closing the valve 111, the well 101 is routed to the test separator 105 and isolated from the production separator 106.

The test separator 105 operates to separate oil, water, and gas phases, or to separate liquid from gas phases, and to measure the volumetric flow rates of these components in the production output from one or more wells 101-104 during the course of a well test. The DCS 115 collects these measurements from the test separator 105, such as through a suitable I/O subsystem. Process variables associated with the production testing of the wells 101-104 (which can include variables associated to flow lines, well head and downhole depending on the instrumentation available) are stored in a plant data historian 116.

In accordance with this disclosure, the system 100 includes at least one well test application 117 that supports automation of various well testing activities. In particular, the well test application 117 can support any one or any combination of the following features or operations:

an overview dashboard that continuously provides analytics with Key Performance Indicators (KPIs) of the overall well testing processes as well as quick navigation to different UIs of the application;

automatic creation of schedules for periodic or ad hoc production testing of oil and gas wells;

automated and/or manual workflow for single and multiple well tests;

support for multiple well types and test types;

interpretation of routing activities that occur in test manifolds;

automatic creation of test frames based on the above interpretation;

automatic validation of test frames and generation of production test results from the test frames;

automatic and manual creation of well tests;

automatic validation of well tests and results based on stability/variability;

diagnostic capability to monitor an outage and recovery;

interpretation of routing activities that occurred during an outage;

determination of the status of any interrupted test records created before an outage;

determination of possible new records with correct states that need to be created during an outage;

support of lab sample collection and automatic application to the right well test; and scalability and adaptability to meet a wide range of field configurations for well testing.

The well test application 117 could be implemented in any suitable manner. For example, the well test application 117 could be implemented using software/firmware instructions that are executed by at least one processor or other processing device(s) of one or more servers or other computers. As a particular example, the well test application 117 could be implemented as a web-based application that runs on a separate server or other computing device(s) and is accessed by one or more user interfaces executed in a web client.

The well test application 117 is configured to exchange information and data with the plant data historian 116, such as over one or more wired or wireless network connections. This enables users of the well test application 117 to access and use data from the plant data historian 116, such as to create test records. The well test application 117 can also obtain or hold a complete history of the production tests for the wells 101-104 conducted on various timelines. By checking the time when a well 101-104 was last successfully tested and a local governance period for conducting well tests, the well test application 117 can automatically generate a prioritized test schedule for well testing, such as is described in greater detail below with respect to FIG. 2.

In typical production systems, the DCS 115 controls the diverter valves 107-114 for sequentially routing different producing wells 101-104 to the test separator 105. By periodically monitoring the states of the tags associated with the diverter valves 107-114 and tracing the physical connection relationships in the test manifold, the well test application 117 can determine which well 101-104 is being routed to the test separator 105. The well test application 117 can also automatically create test frames for those wells 101-104. Test frames provide a time frame with parametric information for one or more of the associated well tests, such as is described in greater detail below with respect to FIG. 3.

In addition, each time business or other logic of the well test application 117 runs, the well test application 117 can check the timing of test records that are created and update the statuses of those records. Once the test records successfully reach the end of a test, validation logic can be executed by the well test application 117 to determine the stability of test parameters and automatically validate those test frame records. Further details of automatically validating test frames are provided below with respect to FIG. 4.

In case of an outage of integration or abnormal stopping of the business logic, on the next successful recovery, the well test application 117 can check the plant data historian 116 and determine various events that occurred during this downtime. Then the well test application 117 can also make any necessary decisions, update the status of existing tests, create new test records, or perform other actions as needed.

In some embodiments, one or more diagnostic UIs can be provided by the well test application 117, which a user can monitor in order to view the status of the automated workflow. In the event of an issue with the automated workflow, the user can determine the issue and quickly take necessary correction actions. The well test application 117 provides a means to configure the production testing workflow to run in auto or manual mode at runtime. The well test application 117 also provides well and test device configuration UIs, where users can change configuration parameters at runtime without restarting the application. Further details of a user interface are provided below with respect to FIG. 5.

Although FIG. 1 illustrates one example of a system 100 for production testing of oil and gas wells, various changes may be made to FIG. 1. For example, while the DCS 115, the plant data historian 116, and the well test application 117 are shown as separate components, this is merely for clarity of illustration. In some embodiments, two or more of these components could be combined into one functional unit or executed by the same processing or computing device(s). As another example, two or more test separators 105 or production separators 106 may be used in a system with a larger number (such as dozens or hundreds) of wells. In addition, the makeup and arrangement of the system 100 are for illustration only. Components could be added, omitted, combined, or placed in any other configuration according to particular needs.

Figure 2:
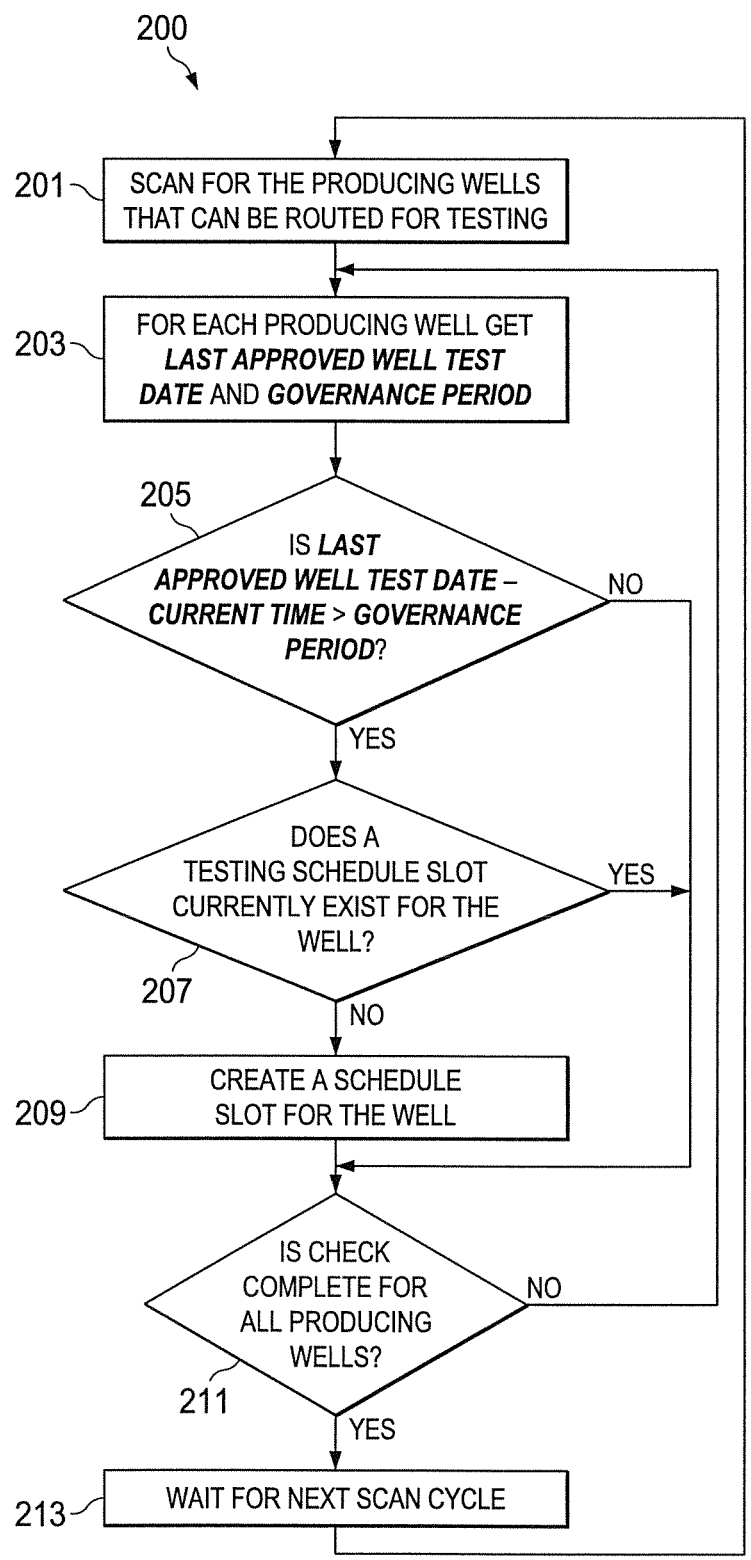
FIG. 2 illustrates an example method for automatically creating well testing schedules according to this disclosure.

FIG. 2 illustrates an example method 200 for automatically creating well testing schedules according to this disclosure. For ease of explanation, the method 200 is described as being performed using the system 100 of FIG. 1. However, the method 200 can be performed using any other suitable application, device, or system.

In many jurisdictions, regulations or statutes require that oil and gas wells be tested regularly (such as once a month). The results of such tests help to establish mathematical models that are used in well modeling, well analysis, and planning of production activities. Because well testing equipment, such as the test separator 105, is shared among a large number of wells, and periodic and representative well test results must be ensured, it is typically necessary or desirable to establish a well testing schedule in order to avoid conflicts between required well tests for multiple wells. For example, in some production environments, the average test period is approximately twelve hours for one well, so only two wells can be tested by the same well testing equipment per day. If there are thirty wells to test, this will likely require fifteen days of testing. A testing schedule is used to keep track of what wells are to be tested at what time.

Many well testing schedules are created manually. However, such a manual process can be very tedious due to the dynamic nature of well testing. For example, issues may arise or be detected in a particular well that require a high priority ad hoc test of that well or require a more frequent testing interval for that well. In such cases, a well testing schedule may be adjusted to accommodate the ad hoc test. Other such issues can arise that necessitate a change to a well testing schedule. The automated method 200 can accommodate such issues. The well configuration UIs can be accessed at runtime for changing the testing governance period of the required well(s).

At step 201, a scan is performed for all producing wells that are subject to being routed to test equipment for testing. In many oil and gas fields, there can be hundreds of producing wells, but only a subset of the wells may be routed for testing when necessary. If a well is marked as shut-in, it needs to be excluded from tests; otherwise it would be wasting valuable time that could be used to test another well. The well configuration UIs can be accessed to set a well as shut-in or automatically get a variable for a plant data historian reflecting the well status. The scan may include, for example, the well test application 117 or the DCS 115 reading tags or other identifiers of the wells 101-104 to determine if each well 101-104 is subject to testing and is not shut-in. As another example, the scan may include the well test application 117 reading a list of testable wells from a data file or database.

At step 203, for each identified well available for testing, the last approved well test date and the testing governance period (such as the well testing frequency provided by statute or regulation) for that well are determined. This may include, for example, the well test application 117 determining the last approved well test date and the testing governance period for one of the wells 101-104. Such information may be obtained from a data file or database. As a particular example, the well test application 117 may read a data table to determine that, for the well 101, the last approved well test was thirty-one days ago and the testing governance period is thirty days.

At step 205, it is determined whether the last approved well test date is within the governance period or outside the governance period. This may include, for example, the well test application 117 determining if the following expression is true or false:

Last Approved Well Test Date−Current Time>Governance Period.

In the preceding example, it may be determined that the last approved well test for the well 101 (thirty-one days before the current time) is greater than the testing governance period (thirty days).

If it is determined in step 205 that the last approved well test date is within the governance period, the method 200 moves to step 211. Alternatively, if it is determined in step 205 that the last approved well test date is not within the governance period, the method 200 moves to step 207 in which it is determined whether a testing schedule time slot currently exists for the well in a well testing schedule. This may include, for example, the well test application 117 reviewing a well test schedule to determine whether the well 101 is currently scheduled for a test.

If it is determined in step 207 that a testing schedule time slot currently exists for the well in the well testing schedule, the method 200 moves to step 211. Alternatively, if it is determined in step 207 that a testing schedule slot does not currently exist for the well in the well testing schedule, the method 200 moves to step 209 in which a schedule slot for the well is created. While creating the schedule for a well, its association with the right test device, as well as the minimum purge duration and test duration need to be considered, along with the required testing priority as the default priority or high priority. Based on this, the proper test schedule with the key parameters can be created. This may include, for example, the well test application 117 automatically generating a schedule slot for the well 101 which was overdue for testing.

At step 211, it is determined whether all producing wells that are subject to testing have been checked. This may include, for example, the well test application 117 reviewing the list of testable wells to determine whether each well has been scheduled for testing. If it is determined that there are additional wells to check, the method 200 returns to step 203 for the next well in the list. Alternatively, if it is determined that the check of all wells is complete, the method 200 moves to step 213 and waits for the next scan cycle. At the start of the next scan cycle, the method 200 returns to step 201 and starts over. In some embodiments, the scan cycle may coincide with one employee shift (such as eight hours, twelve hours, or any other suitable timeframe). This scan interval can be configured from the diagnostic UI that is used for monitoring the status of the automated testing workflows.

Once the well test application 117 automatically creates the testing schedule, the well test application 117 can send the schedule to the DCS 115 for posting and review by field operators or other personnel. The personnel can periodically review the schedule and control the DCS 115 to perform well testing according to the schedule. Also, navigation to the corresponding test frame or well test can be provided from the UI, which shows a list of schedules created along with details such as status, priority, etc.

Although FIG. 2 illustrates one example of a method 200 for automatically creating well testing schedules, various changes may be made to FIG. 2. For example, while shown as a series of steps, various steps shown in FIG. 2 could overlap, occur in parallel, occur in a different order, or occur multiple times. Moreover, some steps could be combined or removed and additional steps could be added according to particular needs. Also while creating the schedule itself, logic can be executed to see the usage of the test device. When multiple schedules are created, the priority of pending test schedule slots can indicate to operators which ones to execute first.

Figure 3:
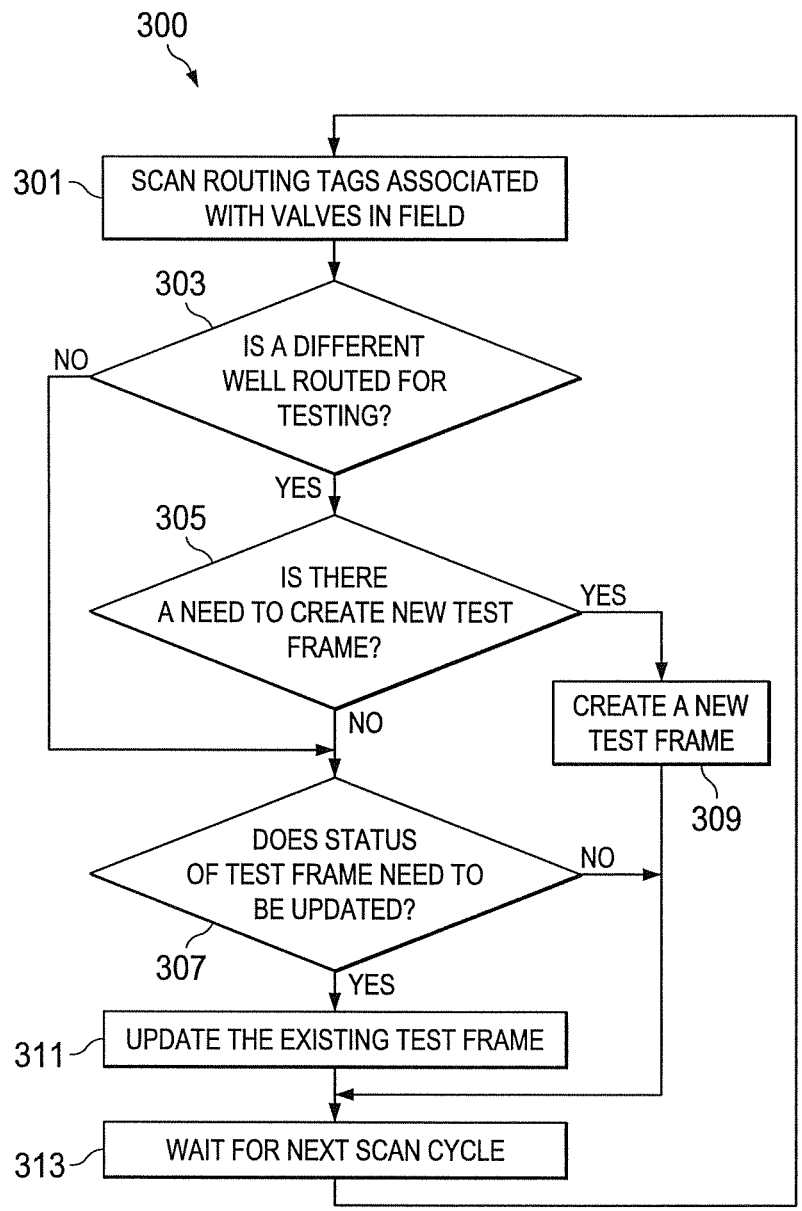
FIG. 3 illustrates an example method for automatically creating test frames according to this disclosure.

FIG. 3 illustrates an example method 300 for automatically creating test frames according to this disclosure. For ease of explanation, the method 300 is described as being performed using the system 100 of FIG. 1. However, the method 300 can be performed using any other suitable application, device, or system.

Once a well testing schedule has been established, it can be used to automatically guide the test execution. As the tests are executed, the well test application 117 can detect when and which wells get routed to the test devices and consequently create or update test frames for analysis of data generated or collected during the well testing. A test frame provides a "time frame" during which a production well is routed to the test device and test data is collected in order to analyze the well test results and store them as test records. For example, a test frame includes an indication of the well that is tested (such as Well #1), a time frame in which the well test is performed (such as Tuesday from 9:00 am to 9:00 pm), various parameters that are examined in the well test (such as well head pressure, oil flow rate, etc.), how often data samples are collected during the well test (such as data collected every 1 minute), and any other suitable information like status of the test.

Because well testing can be human-controlled (such as by operators of the DCS 115), the performed well tests may not necessarily correspond exactly to the automatically generated well testing schedule. Thus, it is important to be able to scan an oil field, automatically determine what well tests are occurring, and automatically generate one or more test frames or update the progress of the test that is to be associated with the well under test. The method 300 can perform these operations.

At step 301, a scan of routing tags associated with diverter valves or any other control devices used at a test manifold in a field is performed in a periodic or aperiodic manner in order to determine the status of well test routing. The well test application 117 enables the user to configure the test manifold used in the field, along with routing devices like RSVs, connections, and associated tags. On each scan, the well test application 117 determines the status of the associated tags and, from these configuration details, infers the well routing and provides an indication of which well or wells are currently routed to the testing equipment for testing. This may include, for example, the well test application 117 or the DCS 115 reading tags associated with the diverter valves 107-114 in order to determine which of the wells 101-104 is routed to the test separator 105. As a particular example, the well test application 117 could determine that the valve 107 is open and the valves 108-110 are closed, thus only the well 101 is routed to the test separator 105.

At step 303, it is determined whether a well that is routed for well testing has changed. For example, it can be determined whether the well that is currently routed for testing is different from the routed well that was previously detected. This may include, for example, the well test application 117 comparing the current state of the diverter valve tags to a previous state of the diverter valve tags to determine whether a different well 101-104 is now routed to the test separator 105.

If it is determined in step 303 that the well routed for well testing has changed, the method 300 moves to step 305. Alternatively, if it is determined in step 303 that the well routed for well testing has not changed, the method 300 moves to step 307. At step 305, it is determined whether a new test frame needs to be created for the well test. This may include, for example, the well test application 117 reviewing a list or table of existing test frames to determine if such a test frame exists for the routed well.

If it is determined in step 305 that a new test frame needs to be created, the method 300 moves to step 309. Alternatively, if it is determined in step 305 that a new test frame does not need to be created, the method moves to step 307. At step 309, a new test frame is created. This may include, for example, the well test application 117 creating a test frame for one of the wells 101-104. The created test frame can include an indication of a well that is tested, a time frame in which the well test is performed, various parameters that are examined in the well test, how often data samples are collected during the well test, and any other suitable information. Also this newly created test frame gets linked with the corresponding well test schedule and state synchronization of these records can happen At step 307, it is determined whether a status of the existing test frame needs to be updated. This may include, for example, the well test application 117 determining that the existing test frame for the routed well is still marked as an active test and has not been marked as completed.

If it is determined in step 307 that the status of the existing test frame needs to be updated, the method 300 moves to step 311. At step 311, the existing test frame is updated. This may include, for example, the well test application 117 marking the test frame as completed. Alternatively, if it determined in step 307 that the status of the existing test frame does not need to be updated, the method 300 moves to step 313 and waits for the next scan cycle. At the start of the next scan cycle, the method 300 returns to step 301 and starts over. In some embodiments, the scan cycle may coincide with one operator shift (such as eight hours, twelve hours, or any other suitable timeframe).

Although FIG. 3 illustrates one example of a method 300 for creating test frames, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

Figure 4:
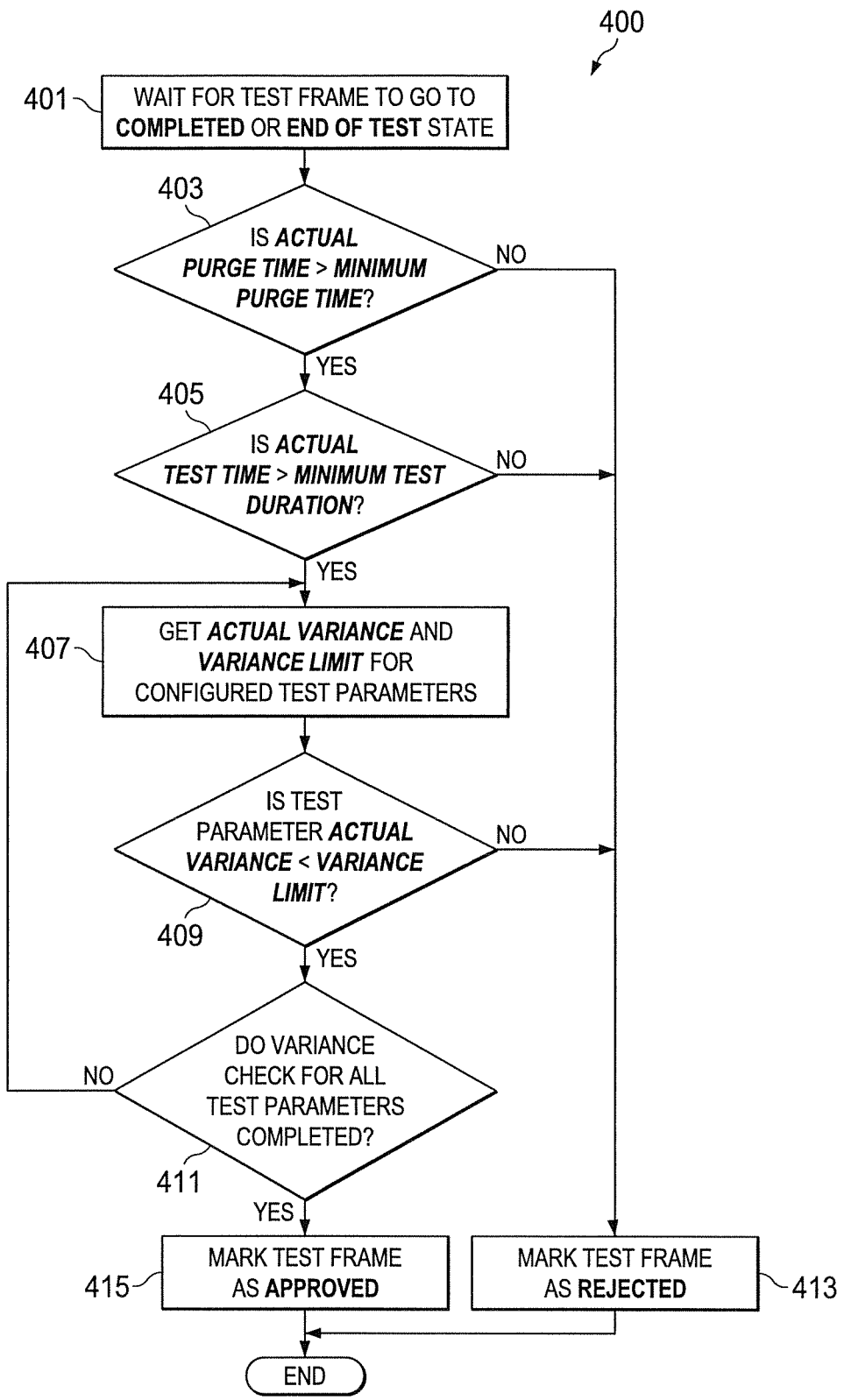
FIG. 4 illustrates an example method for automatically validating test records according to this disclosure.

FIG. 4 illustrates an example method 400 for automatically validating test records according to this disclosure. For ease of explanation, the method 400 is described as being performed using the system 100 of FIG. 1. However, the method 400 can be performed using any other suitable application, device, or system.

Once test frame data is collected, a test frame can be analyzed to determine if the test frame is valid (such as acceptable). In some tests, the tested parameters do not stabilize or the test timings such as purge time and test duration are inadequate, so the test frame is not useful or will not have representative data and can be discarded. In other test frames, at least a portion of the test has relatively stable values. That is, the variances of specified test variables are within a predetermined limit and actual test durations meet minimum predefined limits. Such a test frame is useful and can be retained. The required timing limits and test parameters with variance limits can be configured at the well level. The configuration UIs enable runtime modification of these limits. The automated method 400 can continue to perform this validation and approval of the test frame.

At step 401, the method 400 waits until a test frame is completed. This may include, for example, the well test application 117 waiting until the test frame is marked as "Completed," "End of Test," or another similar status. Once the test frame is completed, the method 400 continues to step 403.

At step 403, it is determined whether an actual purge time for the test frame is greater than a minimum purge time. Typically, during an initial portion of a test frame, the data collected or measured at the well may be erroneous, such as due to initial fluctuations in the oil or gas product arriving at the testing device, or due to trapped fluid measured by the test device corresponding to previously routed wells through the test device in consideration. Such initially collected data is purged from the test frame in order to have a more accurate set of test data. Because the collected data can include time-series data, the amount of data that is purged could be indicated according to the period of time represented by the purged data. For example, the purged data may represent the first one hour of collected data in a test frame. This time is compared to a predetermined minimum purge time as a default value for all wells or as an specific value for the well under test. Thus, the determination whether an actual purge time for a test frame is greater than a minimum purge time can include, for instance, the well test application 117 determining the predetermined minimum purge time for the test frame and comparing the actual purge time for the test frame to the predetermined minimum purge time.

If it is determined in step 403 that the actual purge time for the test frame is greater than the required minimum purge time, the method 400 moves to step 405. Alternatively, if it determined in step 403 that the actual purge time for the test frame is not greater than the minimum purge time, the method 400 moves to step 413, where the test frame is marked as rejected.

At step 405, it is determined whether an actual test time of the test frame is greater than a minimum test duration. Typically, test frames must be longer than a predetermined minimum test duration in order to have enough collected data to be representative and useful. For example, a test frame may need to be at least twelve hours long in order to be useful. Thus, the determination whether an actual test time of the test frame is greater than a minimum test duration can include, for instance, the well test application 117 determining the predetermined minimum test duration for the test frame and comparing the actual duration of the test frame to the predetermined minimum test duration.

If it is determined in step 405 that the actual test duration of the test frame is greater than the minimum test duration required, the method 400 moves to step 407. Alternatively, if it determined in step 405 that the actual test duration of the test frame is not greater than the minimum test duration required, the method 400 moves to step 413, where the test frame is marked as rejected.

At step 407, the actual variance and variance limits for one or more test parameters of the test frame are considered. This may include, for example, the well test application 117 looking up a variance limit for one or more test parameters in a data file or database and calculating actual variance from the collected data of the test frame. For a given test parameter of the test frame (such as pressure, oil flow rate, etc.), the collected data may need to be generally stable over a period of time in order to be useful for examination. That is, the variance of the data over time can be within a predetermined variance limit. The variance limit may be indicated according to a standard deviation, an average value, or another suitable statistical measurement.

At step 409, it is determined, for a given test parameter, whether the actual variance of the test parameter during the test frame is less than the predetermined variance limit. This may include, for example, the well test application 117 comparing the actual variance of the test parameter to the predetermined variance limit.

If it is determined in step 409 that the actual variance of the test parameter is less than the variance limit, the method 400 moves to step 411 to determine if variance of additional test parameters need to be checked. Alternatively, if it determined in step 409 that the actual variance of the test parameter is not less than the variance limit, the method 400 moves to step 413, where the test frame is marked as rejected.

At step 411, it is determined whether all test parameters that were configured for variance check have been examined. If not, the method 400 returns to step 407 and the variance of the next test parameter is examined. Alternatively, if all test parameters have been examined, the variance check is completed, and the method moves to step 415 where the test frame is marked as approved. This may include, for example, the well test application 117 setting an indicator or flag associated with the test frame to an "approved" setting.

Although FIG. 4 illustrates one example of a method 400 for automatically validating test records, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

Figure 5:
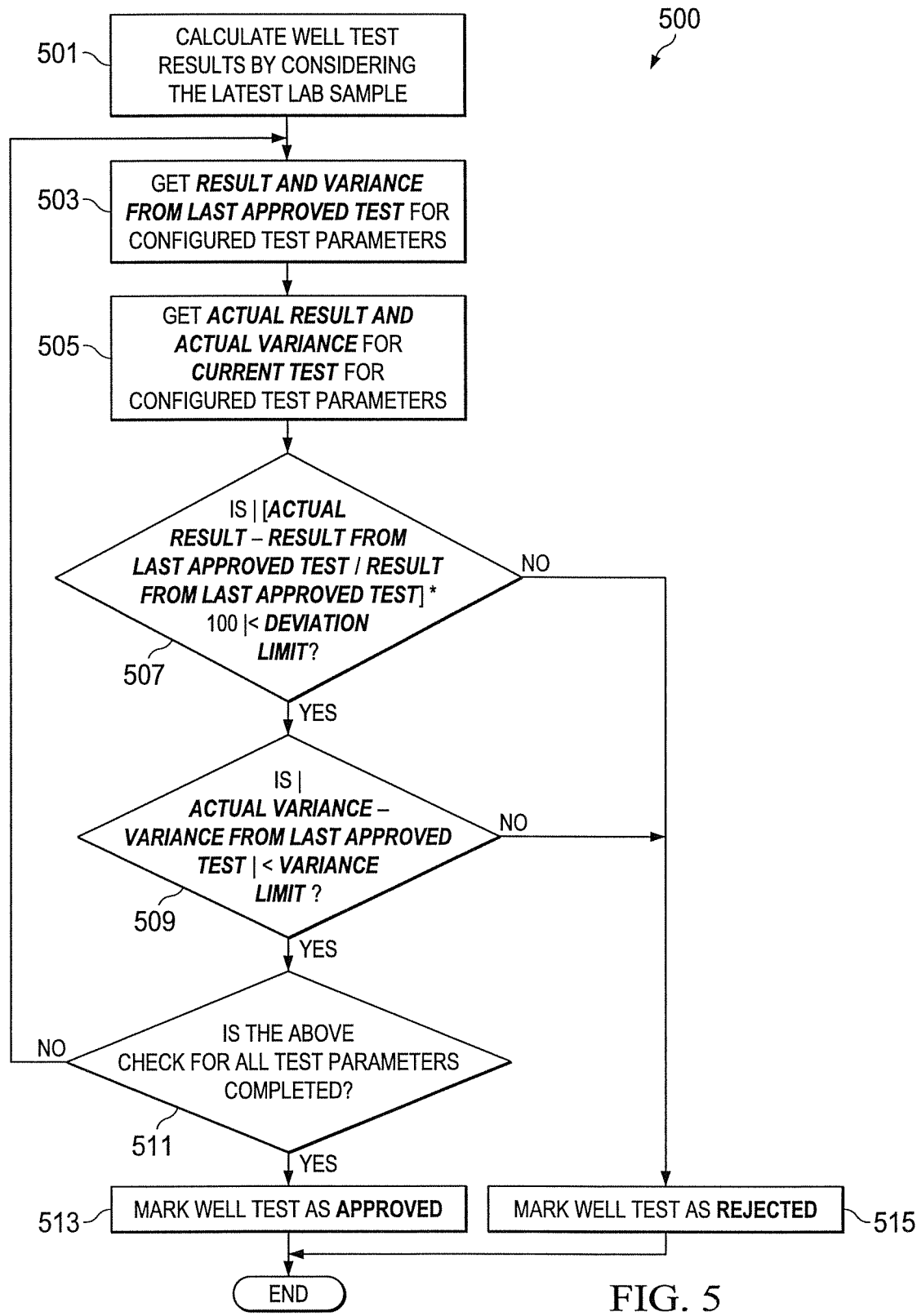
FIG. 5 illustrates an example method for automatically validating a well test according to this disclosure.

FIG. 5 illustrates an example method 500 for automatically validating a well test according to this disclosure. For ease of explanation, the method 500 is described as being performed using the system 100 of FIG. 1. However, the method 500 can be performed using any other suitable application, device, or system.

In step 501, once a test frame is automatically validated (such as by using the method 400 of FIG. 4), a set of well test records can automatically be created and test results of the well can be calculated based on the collected test frame data of the validated test frame. This well test record can be linked with the corresponding well test schedule as well as the test frame. According to some embodiments, actual well test results are calculated from the validated test frame, which results in the generation of well test records. In general, the well test results represent a stable and representative subset of records collected during a test frame. To obtain the well test results, the well test application 117 can, for instance, take time series samples of data from the test frame, apply one or more configured aggregation routines to the data, and derive results.

To obtain and approve the well test results from the collected test frame data, a reference set of data can be used for a comparison. That is, the calculated well test result is compared to corresponding data from the reference set. In step 503, the reference set of data is determined from the last approved well tests previously performed for the same well.

Once a reference set of data is determined, such as from the last good well test, the current well test results can be compared to the reference set. In particular, in step 505, the well test application 117 can determine, for each test parameter, a deviation and a variance of the parameter in the current well test compared to the corresponding parameter in the reference set. The deviation can be determined by calculating an average value of the test parameter in the current well test, calculating an average value of the test parameter in the reference set, and subtracting the two. The deviation can be expressed as a percentage. For example, if the average oil flow rate in the current frame set is 103.1 bpd and the average oil flow in the reference set is 100 bpd, the deviation is 3.1% ((103.1−100)/100). Similarly, the variance of the parameter can be determined by calculating a variance of the test parameter in the current well test, calculating a variance of the test parameter in the reference set, and subtracting the two. For instance, if the variance of the oil flow in the current test frame set is 7% and the variance of the oil flow rate in the reference set is 9%, the change in variance is 2%.

Both the deviation and the variance can be compared to predetermined threshold values for each parameter. In step 507, the deviation is compared to the predetermined threshold value for deviation. In step 509, the variance is compared to the predetermined threshold value for variance. These threshold values can be configured for the well using configuration UIs, which can be modified at runtime. For example, for the oil flow rate parameter, the threshold value for deviation may be 3% and the threshold value for variance may be 1%.

The same process is performed for other test parameters. In step 511, a check is made to determine if all test parameters have been completed. If not, the method 500 returns to step 503 for additional test parameters. Otherwise, the method 500 moves to step 513. While deviation and variance are described here, it will be understood that additional or alternative aggregations of data values and other statistical comparisons of data are within the scope of this disclosure.

If both the deviation and the variance of oil flow rate in the current test frame are less than the predetermined thresholds, then in step 513, the well test data is considered acceptable and the well test is marked as "Approved" or given another similar acceptable rating. Also the corresponding well test schedule state is changed to a completed status. Alternatively, if either the deviation, the variance, or both exceed the predetermined threshold(s), then in step 515, the well test data is considered unacceptable and the well test is marked as "Rejected" or given another similar unacceptable rating. The state of the well test schedule corresponding to this well remains in schedule state only, so that operator knows to take up that well for testing again.

Although FIG. 5 illustrates one example of a method 500 for automatically validating a well test, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

Figure 6:
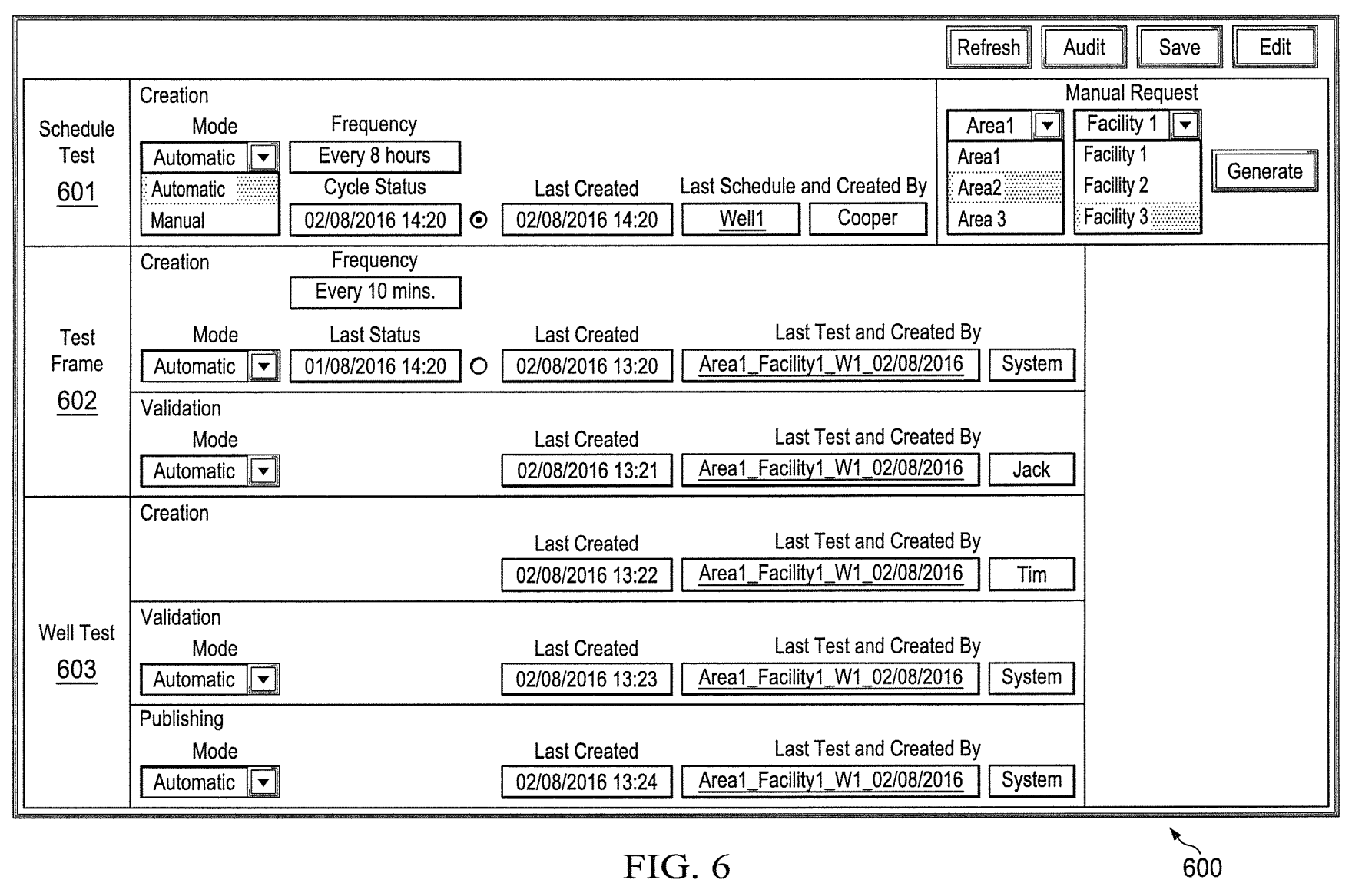

FIG. 6 illustrates an example user interface 600 for configuring, performing, and monitoring automated well testing functions according to this disclosure. For ease of explanation, the user interface 600 may represent a screen from the well test application 117. However, the user interface 600 may be used with any other suitable application, device, or system.

As shown in FIG. 6, the user interface 600 includes logical groupings or functional groups 601-603 that are organized based on commonality of the controls and fields in each group corresponding to workflow of the well test. For example, the user interface 600 includes a functional group 601 for scheduling a test, a functional group 602 for creation and validation of a test frame, and a functional group 603 for creation, validation, and publication of a well test. Controls and data fields within the functional groups 601-603 allow a user to monitor and control performance of various operations, such as those described with respect to the methods 200, 300, 400, 500 in FIGS. 2 through 5.

While not explicitly shown in FIG. 6, the user interface 600 may include other controls (such as controls on other tabs) for operations related to well test outages. Sometimes, an outage (such as an equipment outage, a communication outage, etc.) may occur during a well test. The user interface 600 can include various diagnostic capabilities to monitor and recover from the outage. In particular, the user interface 600 can include one or more controls or displays to interpret routing activities that occurred during the outage. Additionally, if any test records were generated before the outage, the user interface 600 can communicate with the plant historian 116 to determine the status for such "hanging" test records created before the outage, and determine possible new records to be created during the outage.

Although FIG. 6 illustrates one example of a user interface 600 for configuring, performing, and monitoring automated well testing functions, various changes may be made to FIG. 6. For example, various display components in FIG. 6 could be combined, further subdivided, or omitted and additional components could be added according to particular needs. As a particular example, a UI could be provided to configure well testing parameters per well, such as minimum test duration, variance limits and other parameters. In general, user interfaces can come in a wide variety of configurations, and FIG. 6 does not limit this disclosure to any particular configuration.

Figure 7:
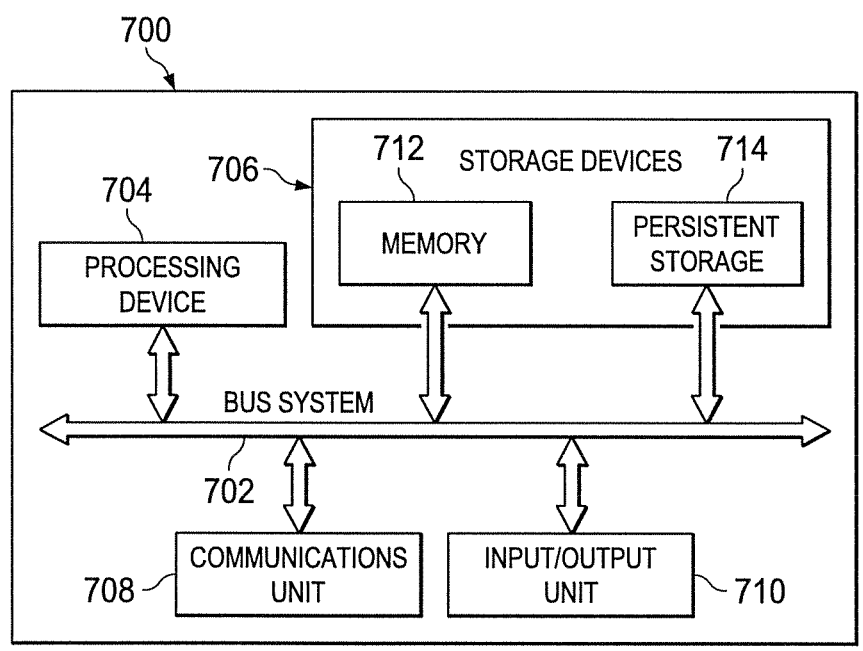
FIG. 7 illustrates an example device for performing well testing functions according to this disclosure.

FIG. 7 illustrates an example device 700 for performing well testing functions according to this disclosure. The device 700 could, for example, represent a computing device for executing the well test application 117 in FIG. 1 and performing the operations described in FIGS. 2 through 5. As another example, the device 700 could represent an operator station for displaying the user interface 600 shown in FIG. 6. However, the well test application 117 in FIG. 1 and the operations described in FIGS. 2 through 5 could be used with any other suitable device and in any other suitable system.

As shown in FIG. 7, the device 700 can include a bus system 702, which supports communication between at least one processing device 704, at least one storage device 706, at least one communications unit 708, and at least one input/output (I/O) unit 710. The processing device 704 executes instructions that may be loaded into a memory 712. The processing device 704 may include any suitable number (s) and type(s) of processors or other devices in any suitable arrangement. Example types of processing devices 704 include microprocessors, microcontrollers, digital signal processors, field programmable gate arrays, application specific integrated circuits, and discrete circuitry.

The memory 712 and a persistent storage 714 are examples of storage devices 706, which represent any structure(s) capable of storing and facilitating retrieval of information (such as data, program code, and/or other suitable information on a temporary or permanent basis). The memory 712 may represent a random access memory or any other suitable volatile or non-volatile storage device(s). The persistent storage 714 may contain one or more components or devices supporting longer-term storage of data, such as a read only memory, hard drive, Flash memory, or optical disc. In accordance with this disclosure, the memory 712 and the persistent storage 714 may be configured to store instructions associated with performing and monitoring automated well testing functions.

The communications unit 708 supports communications with other systems, devices, or networks. For example, the communications unit 708 could include a network interface that facilitates communications over at least one Ethernet network or other similar network. The communications unit 708 could also include a wireless transceiver facilitating communications over at least one wireless network. The communications unit 708 may support communications through any suitable physical or wireless communication link(s).

The I/O unit 710 allows for input and output of data. For example, the I/O unit 710 may provide a connection for user input through a keyboard, mouse, keypad, touchscreen, or other suitable input device. The I/O unit 710 may also send output to a display, printer, or other suitable output device.

Although FIG. 7 illustrates one example of a device 700 for performing well testing functions, various changes may be made to FIG. 7. For example, various components in FIG. 7 could be combined, further subdivided, or omitted and additional components could be added according to particular needs. Also, computing devices can come in a wide variety of configurations, and FIG. 7 does not limit this disclosure to any particular configuration of device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

automatically creating one or more test schedules for a well test of one or more wells in an oil or gas production environment;

automatically creating one or more test frames for use in the generation of the one or more test schedules for the well test, each of the test frames providing a specified time frame during which a corresponding well of the one or more wells is routed to a test device and test data is collected, the automatically creating the one or more test frames for use in the generation of the well test comprises:

scanning one or more tags associated with diverter valves or routing devices that selectively route the one or more wells to the test device in the oil or gas production environment;

determining, based on a status of the one or more tags, whether a current well that is routed for well testing has changed from a previous well that was previously routed for well testing by comparing a previous state of the one or more tags to a current state of the one or more tags;

when the current well that is routed for well testing has changed from the previous well that was previously routed for well testing, determining if a test frame already exists for the well test;

when a test frame for the current well that is routed for well testing does not already exist, creating a new test frame for the current well that includes a specified time frame during which the well test is to be performed for the current well;

when a test frame for the current well that is routed for well testing does exist, determining whether a status for the test frame for the current well needs to be updated based on whether the well test for the current well is completed;

when the well test associated with the test frame for the current well is completed, updating the status for the test frame for the current well to indicated the test frame is complete;

automatically updating, based on the test frame for the current well, the test schedule for the well test; and following execution of the one or more test frames of the well test, automatically validating one or more test records generated during the corresponding test frames.

2. The method of claim 1, wherein automatically updating the test schedule for the well test comprises:
  determining the one or more wells associated with the well test.

3. The method of claim 1, wherein automatically validating the one or more test records generated during the corresponding test frames comprises:
  determining whether an actual purge time for the corresponding test frame is greater than a predetermined minimum purge time;
  determining whether an actual test time of the corresponding test frames is greater than a predetermined minimum test duration;
  determining an actual variance and a predetermined variance limit for each of one or more test parameters of the corresponding test frames; and
  for each test parameter, determining whether the actual variance of the test parameter is less than the predetermined variance limit.

4. The method of claim 1, further comprising:
  after validating the one or more test records, approving test results by comparing the test results against previously accepted test results for the one or more wells,
  wherein the comparing includes comparing at least a deviation and a variance of one test parameter between the one or more test records generated during the one or more test frames and corresponding data in a last good well test.

5. The method of claim 1, further comprising:
  exchanging data related to the well test with (i) a distributed control system (DCS) that controls one or more operations of the oil or gas production environment and (ii) a plant data historian that stores data associated with the oil or gas production environment.

6. The method of claim 5, further comprising:
  following an outage that occurred during the well test, communicating with the plant data historian to determine a status of well test records created before the outage.

7. The method of claim 1, wherein the status of the one or more tags is indicative of a position of the diverter valves or routing devices in the oil or gas production environment.

8. An apparatus comprising:
  at least one memory configured to store data associated with a well test of one or more wells in an oil or gas production environment; and
  at least one processing device configured to:
    automatically create one or more test schedules for the well test of the one or more wells in the oil or gas production environment;
    automatically create one or more test frames for use in the generation of the one or more test schedules for the well test, each of the test frames providing a specified time frame during which a corresponding well of the one or more wells is routed to a test device and test data is collected, the automatically creating the one or more test frames for use in the generation of the well test comprises:
      a scan of one or more tags associated with diverter valves or routing devices that selectively route the one or more wells to the test device in the oil or gas production environment;
      a determination, based on a status of the one or more tags, whether a current well that is routed for well testing has changed from a previous well that was previously routed for well testing based on the scan of the one or more tags;
      when the current well that is routed for well testing has changed from the previous well that was previously routed for well testing, a determination of whether a test frame already exists for the well test;
      when a test frame for the current well that is routed for well testing does not already exist, a creation of a new test frame for the current well that includes a specified time frame during which the well test is to be performed for the current well;
      when a test frame for the current well that is routed for well testing does exist or when the current well that is routed for well testing has not changed, a determination of whether a status for the test frame for the current well needs to be updated based on whether the well test for the current well is completed;
      when the well test associated with the test frame for the current well is completed, updating the status for the test frame for the current well to indicated the test frame is complete;
      an automatic update, based on the test frame for the current well, of the test schedule for the well test; and
    following execution of the one or more test frames of the well test, automatically validate one or more test records generated during the corresponding test frames.

9. The apparatus of claim 8, wherein, to automatically update the test schedule for the well test, the at least one processing device is configured to:
  determine the one or more wells associated with the well test.

10. The apparatus of claim 8, wherein, to automatically validate the one or more test records generated during the corresponding test frames, the at least one processing device is configured to:
  determine whether an actual purge time for the corresponding test frames is greater than a predetermined minimum purge time;
  determine whether an actual test time of the corresponding test frames is greater than a predetermined minimum test duration;
  determine an actual variance and a predetermined variance limit for each of one or more test parameters of the corresponding test frames; and
  for each test parameter, determine whether the actual variance of the test parameter is less than the predetermined variance limit.

11. The apparatus of claim 8, wherein the at least one processing device is further configured to:
  after validating the one or more test records, approve test results by comparing the test results against previously accepted test results for the one or more wells,
  wherein the comparing includes comparing at least a deviation and a variance of one test parameter between the one or more test records generated during the one or more test frames and corresponding data in a last good well test.

12. The apparatus of claim 8, wherein the at least one processing device is further configured to:
  exchange data related to the well test with (i) a distributed control system (DCS) that controls one or more operations of the oil or gas production environment and (ii) a plant data historian that stores data associated with the oil or gas production environment.

13. The apparatus of claim 12, wherein the at least one processing device is further configured to:
following an outage that occurred during the well test, communicate with the plant data historian to determine a status of well test records created before the outage.

14. A non-transitory computer readable medium containing instructions that, when executed by at least one processing device, cause the at least one processing device to:
automatically create one or more test schedules for a well test of one or more wells in an oil or gas production environment;
automatically create one or more test frames for use in the generation of the one or more test schedules for the well test, each of the test frames providing a specified time frame during which a corresponding well of the one or more wells is routed to a test device and test data is collected, the automatically creating the one or more test frames for use in the generation of the well test comprises:
  a scan of one or more tags associated with diverter valves or routing devices that selectively route the one or more wells to the test device in the oil or gas production environment;
  a determination, based on a status of the one or more tags, whether a current well that is routed for well testing has changed from a previous well that was previously routed for well testing based on the scan of the one or more tags;
  when the current well that is routed for well testing has changed from the previous well that was previously routed for well testing, a determination of whether a test frame already exists for the well test;
  when a test frame for the current well that is routed for well testing does not already exist, a creation of a new test frame for the current well that includes a specified time frame during which the well test is to be performed for the current well
  when a test frame for the current well that is routed for well testing does exist or when the current well that is routed for well testing has not changed, a determination of whether a status for the test frame for the current well needs to be updated based on whether the well test for the current well is completed;
  when the well test associated with the test frame for the current well is completed, updating the status for the test frame for the current well to indicated the test frame is complete;
  an automatic update, based on the test frame for the current well, of the test schedule for the well test for; and
  following execution of the one or more test frames of the well test, automatically validate one or more test records generated during the corresponding test frames.

15. The non-transitory computer readable medium of claim 14, wherein the instructions to automatically update the test schedule for the well test comprise instructions to:
determine the one or more wells associated with the well test.

16. The non-transitory computer readable medium of claim 14, wherein the instructions to automatically validate the one or more test records generated during the corresponding test frames comprise instructions to:
determine whether an actual purge time for the corresponding test frames is greater than a predetermined minimum purge time;
determine whether an actual test time of the corresponding test frames is greater than a predetermined minimum test duration;
determine an actual variance and a predetermined variance limit for each of one or more test parameters of the corresponding test frames; and
for each test parameter, determine whether the actual variance of the test parameter is less than the predetermined variance limit.

17. The non-transitory computer readable medium of claim 14, further containing instructions that, when executed by the at least one processing device, cause the at least one processing device to:
after validating the one or more test records, approve test results by comparing the test results against previously accepted test results for the one or more wells,
wherein the comparing includes comparing at least a deviation and a variance of one test parameter between the one or more test records generated during the one or more test frames and corresponding data in a last good well test.

18. The non-transitory computer readable medium of claim 14, further containing instructions that, when executed by the at least one processing device, cause the at least one processing device to:
exchange data related to the well test with (i) a distributed control system (DCS) that controls one or more operations of the oil or gas production environment and (ii) a plant data historian that stores data associated with the oil or gas production environment.

* * * * *